United States Patent Office 2,709,624
Patented May 31, 1955

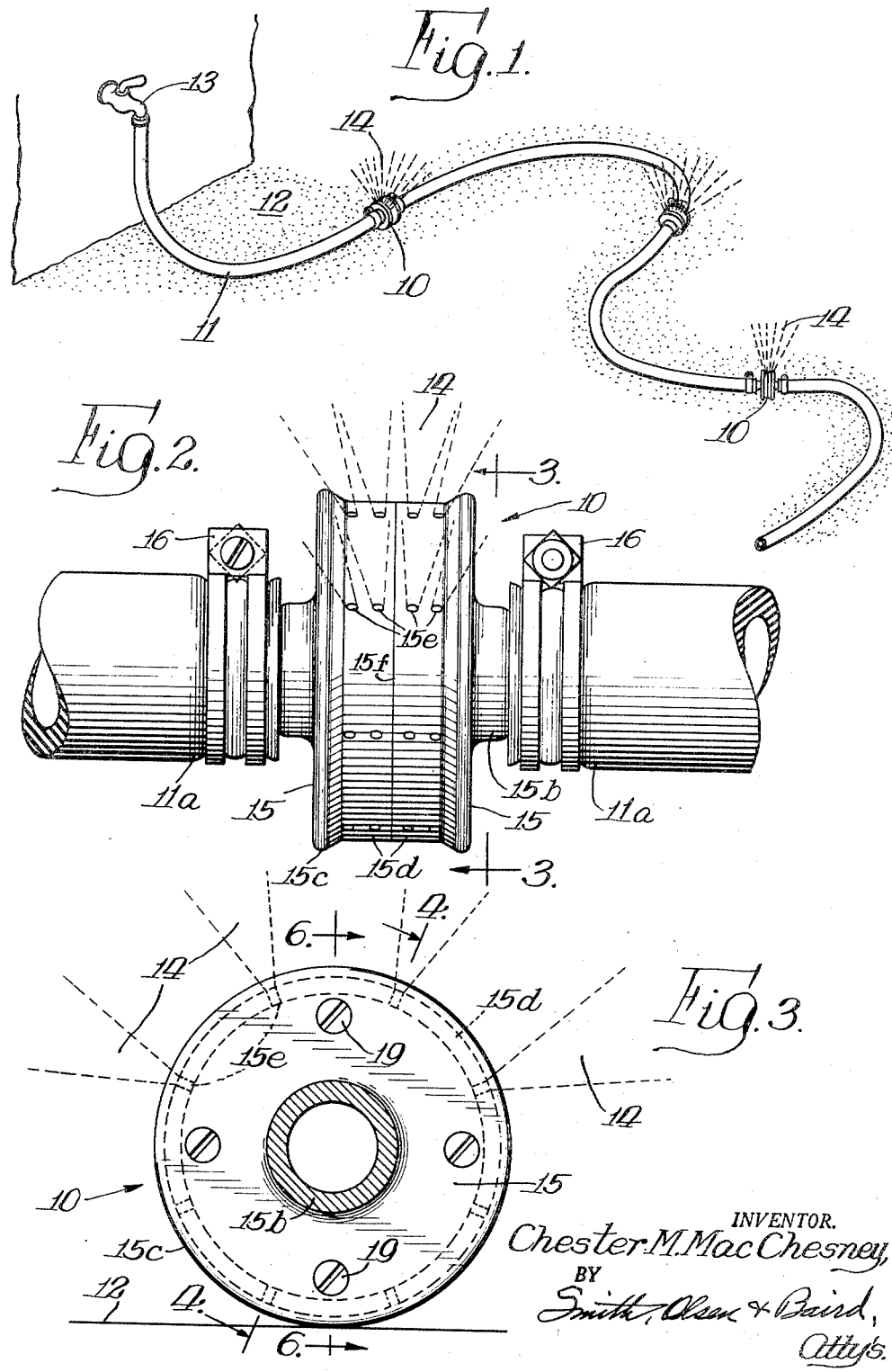

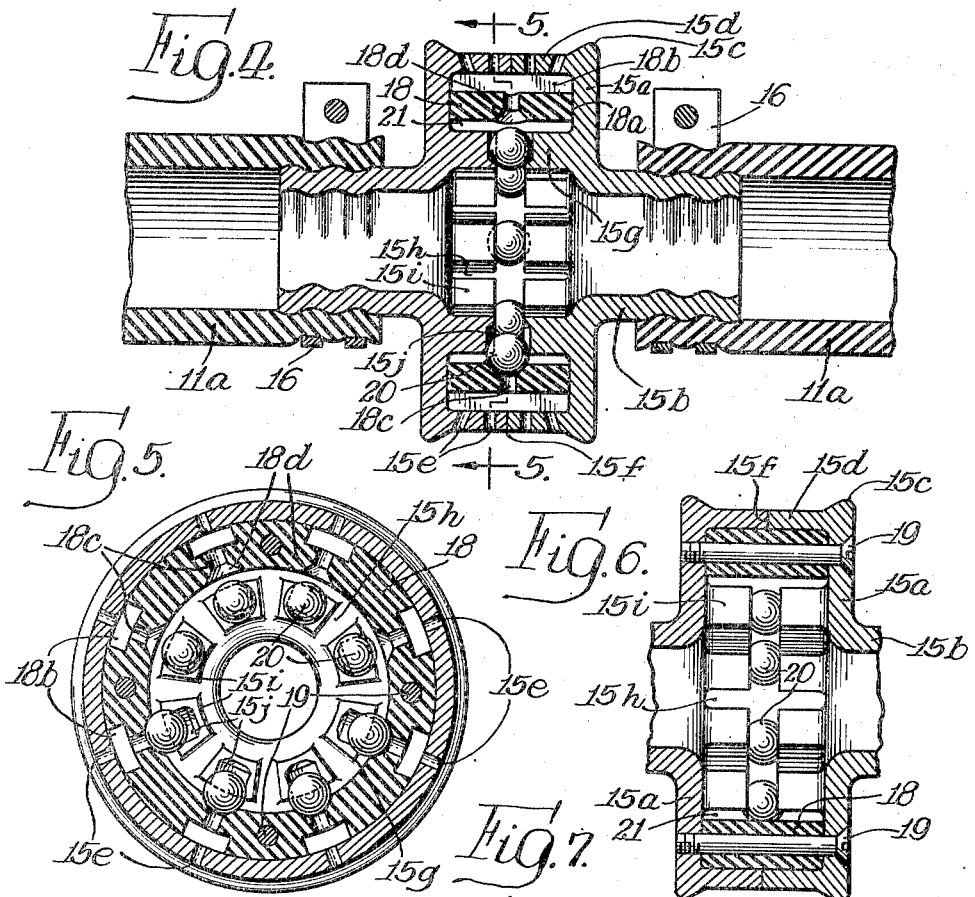
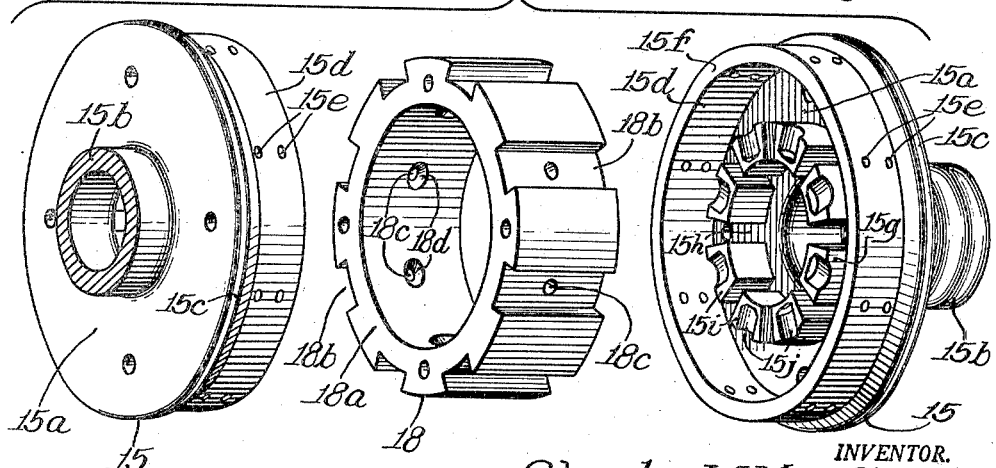

2,709,624

SPRINKLER ATTACHMENT FOR GARDEN HOSE

Chester M. MacChesney, Chicago, Ill.

Application December 6, 1952, Serial No. 324,486

14 Claims. (Cl. 299—105)

This invention relates to a sprinkler attachment for garden hose and its purpose is to provide an improved device of such form that a number of them may be connected in a hose at intervals in order to effect the sprinkling of a lawn over a large area.

The principal object of the invention is to provide an improved sprinkling attachment which may be connected in a garden hose and which will operate automatically to discharge water only in an upward direction without attention to its position with respect to the surface of the ground. A further object is to provide a sprinkler attachment for a garden hose comprising a casing having apertures for discharging water radially outward at various points throughout its periphery in combination with means for automatically rendering ineffective for the discharge of water those openings which are directed downwardly. Still another object of the invention is to provide a sprinkler attachment adapted to be connected in the garden hose and having an annular series of water discharge openings in combination with an annular series of valves, each adapted to control the discharge of water through one or more openings, those valves which are located at any time in the lower part of the attachment being adapted to be automatically closed so that water will be sprayed only in a general upward direction. Other objects of the invention relate to various features of construction and arrangement which will appear more fully hereinafter.

The nature of the invention will be understood from the following specification taken with the accompanying drawings in which one embodiment is illustrated. In the drawings, Figure 1 shows a perspective view of a garden hose in operation with a plurality of the sprinkler attachments of the present invention connected therein;

Fig. 2 shows an enlarged side elevation of one of the sprinkler attachments illustrated in Fig. 1;

Fig. 3 shows a sectional view taken on the line 3—3 of Fig. 2;

Fig. 4 shows a longitudinal axial sectional view taken on the line 4—4 of Fig. 3;

Fig. 5 shows a sectional view taken on the line 5—5 of Fig. 4;

Fig. 6 shows a sectional view taken on the line 6—6 of Fig. 3; and

Fig. 7 shows a perspective view of the complementary casing members of the sprinkler attachment and the valve ring thereof separated axially from each other.

As illustrated in Fig. 1 of the drawings, a number of sprinkler attachments 10, constructed according to the present invention, are connected at intervals in a hose line 11 which is rested upon the lawn 12 and which is connected through the faucet 13 to a source of water supply. The hose 11 and its sprinkler attachments are shown in operation with sprays of water 14 extending upwardly and outwardly from each of the attachments 10.

The improved sprinkler attachment comprises a circular casing which includes two complementary casing members 15 of identical construction. Each casing member comprises a radial disk 15a having a central aperture around which an integral connection is formed with a tube or nipple 15b provided with annular ribs which are adapted to interlock with an end portion 11a of the hose 11 to which it is secured by the usual hose clamp 16. Each radial disk 15a terminates at its outer edge in a circular rib 15c adapted to rest on the surface of the lawn 12 when the device is in use. At a point inwardly from the outer margin of the rib 15c, each disk 15a is formed integrally with a cylindrical flange 15d. Each flange 15d is provided with a plurality of outwardly directed water discharge apertures 15e which are located in pairs with each pair of apertures in one flange 15d registering with the corresponding apertures in the flange 15d of the complementary casing member 15. The inner annular surfaces 15f of the two flanges 15d fit closely against each other, as shown in Figs. 4 and 6, and, when the complementary casing members are secured together, the water discharged through the hose 11 is thus compelled to pass outwardly through the apertures 15e.

On the inner sides of the flanges 15d, there is located an annular valve member 18, formed preferably of rubber or the like, having end faces 18a which fit tightly against the inner surfaces of the radial disks 15a and having an outer segmental circumferential surface which bears against the inner annular surfaces of the flanges 15d. This valve member 18 is provided at intervals on its outer side with transversely extending grooves 18b of rectangular cross section which provide chambers through which water is discharged to the registering discharge openings 15e. The complementary casing members 15 and the valve ring 18 are secured together by four screws 19 which engage apertures in one of the radial disks 15a, with their heads countersunk therein, and which threadedly engage the radial disk 15a of the other casing member.

The valve member 18a is provided with a plurality of water discharge openings 18c each of which is centrally located with respect to one of the grooves or chambers 18b. Each opening 18c is provided with a bevelled or chamfered inner end 18d which forms a valve seat for one of an annular series of spherical ball valves 20 carried by the annular flanges 15g which are formed integrally with the radial disks 15a and extend toward each other. The flanges 15g are provided with oppositely disposed pairs of radially extending slots 15h, thus dividing the flanges 15g into a plurality of equally spaced axially extending projections 15i. Each projection 15i is provided with a radially extending groove 15j extending inwardly from the outer margin thereof and terminating somewhat short of its inner edge in bevelled surfaces which are adapted to conform generally to the curvature of the balls 20. These grooves 15j are of arcuate cross section in directions transverse to the radii of the sprinkler attachment so that these surfaces also conform to the curvature of the balls 20. The projections 15i of each pair which are located opposite to each other on the opposed casing members are spaced apart so that they receive one of the balls 20 between them with a loose sliding fit and the valve cage thus formed is in registry with one of the valve seats 18d formed on the valve ring 18 which is spaced outwardly from the outer margins of the flanges 15g to provide an intervening annular water chamber 21 through which water may pass from the slots 15h in the flanges 15g to the openings 18c which are formed in the valve ring.

With the foregoing construction, the ball valves 20 which are on the upper side of the sprinkler attachment tend to drop down by gravity to rest upon the inner ends of the walls of the grooves 15j so that water passing through the hose 11 is permitted to pass outwardly through the slots 15h into the annular chamber 21 and thence through the communicating openings 18c to those chambers 18b which are located on the upper side of the attachment so that water then flows under pressure through the discharge openings 15c to form the sprays 14 which are illustrated in Fig. 1. At the same time, those ball valve members 20 which are on the lower side of the attachment move downwardly by gravity to engage their registering valve seats 18a, thus closing the openings 18c which are on the underside of the attachment, an action which is supplemented by the pressure of the water bearing upon the upper sides of the ball members after they have reached their closed positions. In this way, the spray of water is discharged in directions which are vertically upward or inclined upwardly while at the same time those water discharge openings which are on the underside of the sprinkler attachment are automatically closed. The operator may thus move the hose and its sprinkler attachments about upon the lawn without any attention to the rotary positions of the sprinkler attachments 10 which, regardless of their positions, are automatically operated to cause the sprays of water to be discharged only in a general upward direction while automatically closing those openings which are directed downwardly, thereby preventing the formation of pools of water beneath the attachments and preventing the erosion of the soil immediately beneath the attachments, by the discharge of sprays of water.

Although one form of the invention has been shown and described by way of illustration, it will be understood that it may be constructed in various other embodiments which come within the scope of the appended claims.

I claim:

1. A sprinkler attachment for a garden hose, comprising a hollow casing having means for connection with a flexible hose resting on the ground and having a plurality of water discharge openings, and means for automatically closing any of said openings when they are directed toward the ground.

2. A sprinkler attachment for a garden hose, comprising a hollow casing having means for connection with a hose and having an annular series of water discharge openings, and means for automatically closing those openings which are directed generally downward.

3. A sprinkler attachment for a garden hose, comprising a circular casing having an annular series of water discharge openings and having means at its ends for connection in a flexible hose line, said casing being free to rotate on the ground with the hose, and means for automatically closing any of said openings which are directed toward the ground in any position of said casing.

4. A sprinkler attachment for a garden hose, comprising a circular casing having an annular series of water discharge openings and having means at its ends for connection in a hose line, said casing being free to rotate on the ground with the hose, and means comprising valves located within said casing for automatically closing some of said openings in any rotary position of said casing.

5. A sprinkler attachment for a garden hose, comprising a circular casing having an annular series of water discharge openings and having means at its ends for connection in a hose line, said casing being free to rotate on the ground with the hose, and means including gravity operated valve members distributed around said casing for automatically closing those openings which are directed toward the ground in any position of said casing.

6. A sprinkler attachment for a garden hose, comprising a casing having a water discharge opening, means for introducing water into said casing, a valve member mounted in said casing and having an aperture communicating with said opening, a second valve member adapted to engage the mouth of said aperture to prevent the flow of water through said opening, and means in said casing for supporting said second valve member when it is not in engagement with the mouth of said aperture.

7. A sprinkler attachment for a garden hose, comprising a casing having a water discharge opening, means for introducing water into said casing, a valve member mounted in said casing and having an aperture communicating with said opening, a ball valve adapted to engage the mouth of said aperture when said aperture is at a higher elevation than said opening, and a cage for supporting said ball valve when said opening is at a higher elevation than said aperture.

8. A sprinkler attachment for a garden hose, comprising a casing having an annular series of water discharge openings and having means for forming a connection with a hose line centrally of said openings, a valve ring mounted in said casing and having an annular series of chambers in its outer side each communicating with one of said openings, said valve ring having an annular series of apertures each communicating with a separate one of said chambers, said casing having a water chamber communicating with said hose connection and with each of said apertures, and a series of valve members adapted to engage the inner ends of said apertures to prevent the flow of water therethrough from said water chamber.

9. A sprinkler attachment for a garden hose, comprising a casing having an annular series of water discharge openings and having means for forming a connection with a hose line centrally of said openings, a valve ring mounted in said casing and having an annular series of chambers in its outer side each communicating with one of said openings, said valve ring having an annular series of apertures each communicating with a separate one of said chambers, said casing having a water chamber communicating with said hose connection and with each of said apertures, a series of valve members adapted to engage the inner ends of said apertures to prevent the flow of water therethrough from said water chamber, and means carried by said casing for supporting and guiding said valve members.

10. A sprinkler attachment for a garden hose, comprising a casing having an annular series of water discharge openings and having means for forming a connection with a hose line centrally of said openings, a valve ring mounted in said casing and having a plurality of apertures therethrough each communicating with a separate one of said openings, said casing having a water chamber communicating with said hose connection and adapted normally to communicate with said apertures, and an annular series of valve members mounted in said casing and adapted to close any aperture when that aperture is above its communicating opening.

11. A sprinkler attachment for a garden hose, comprising a casing having an annular series of water discharge openings and having means for forming a connection with a hose line centrally of said openings, a valve ring mounted in said casing and having a plurality of apertures therethrough each communicating with a separate one of said openings, said casing having a water chamber communicating with said hose connection and adapted normally to communicate with said apertures, a series of ball valve members, and projections on said casing for supporting and guiding said ball valve members with each valve member located radially inward from one of said apertures, said valve members being adapted to move by gravity to close any aperture when that aperture is below the registering valve member.

12. A sprinkler attachment for a garden hose, comprising two complementary casing members each having a radial disk and an annular cylindrical flange seating endwise against the corresponding flange of the other member, means for securing said members together, a nipple carried by each of said disks for forming a connection between the interior of said casing and a hose line, each of said annular flanges having an annular series of spaced water discharge openings, and valve means in said casing for automatically closing those openings which are on the underside of said casing and for automatically opening those which are on the upper side.

13. A sprinkler attachment for a garden hose, comprising two complementary casing members each having a radial disk and an annular cylindrical flange seating endwise against the corresponding flange of the other member, means for securing said members together, a nipple carried by each of said disks for forming a connection between the interior of said casing and a hose line, each of said annular flanges having an annular series of spaced water discharge openings, a non-metallic compressible valve ring secured between said disks on the inner sides of said flanges and having an annular series of spaced radial apertures therethrough each communicating with at least one of said apertures, said ring having valve seats at the inner ends of said apertures, a plurality of ball valve members each adapted to engage one of said seats, and means for supporting said ball valve members for radial movement.

14. A sprinkler attachment for a garden hose, comprising two complementary casing members each having a radial disk and an annular cylindrical flange seating endwise against the corresponding flange of the other member, means for securing said members together, a nipple carried by each of said disks for forming a connection between the interior of said casing and a hose line, each of said annular flanges having an annular series of spaced water discharge openings, a non-metallic compressible valve ring secured between said disks on the inner sides of said flanges and having an annular series of spaced radial apertures therethrough each communicating with at least one of said apertures, said ring having valve seats at the inner ends of said apertures, a plurality of ball valve members each adapted to engage one of said seats, and a plurality of projections extending axially from said disks in pairs, each pair of projections having registering grooves at their ends for supporting and guiding one of said ball valve members for radial movement.

References Cited in the file of this patent
UNITED STATES PATENTS

| | | |
|---|---|---|
| 584,822 | Macksey | June 22, 1897 |
| 2,621,976 | Sliepcevich | Dec. 16, 1952 |